US011092324B2

(12) United States Patent
Mourou et al.

(10) Patent No.: US 11,092,324 B2
(45) Date of Patent: Aug. 17, 2021

(54) SEMI-TRANSPARENT SIGN TEMPERATURE PROTECTION

(71) Applicant: GM Global Technology Operations LLC, Detroit, MI (US)

(72) Inventors: Julien P. Mourou, Bloomfield Hills, MI (US); Richard Chiang, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 346 days.

(21) Appl. No.: 16/367,851

(22) Filed: Mar. 28, 2019

(65) Prior Publication Data

US 2020/0309361 A1    Oct. 1, 2020

(51) Int. Cl.

| G09F 13/10 | (2006.01) |
| F21V 29/505 | (2015.01) |
| F21V 29/70 | (2015.01) |
| F21V 29/508 | (2015.01) |
| F21V 29/90 | (2015.01) |
| B60R 1/00 | (2006.01) |
| B60R 11/02 | (2006.01) |
| G01K 1/14 | (2021.01) |
| G09F 13/04 | (2006.01) |

(52) U.S. Cl.
CPC ............ *F21V 29/505* (2015.01); *B60R 1/001* (2013.01); *B60R 11/0235* (2013.01); *B60R 11/0264* (2013.01); *F21V 29/508* (2015.01); *F21V 29/70* (2015.01); *F21V 29/90* (2015.01); *G01K 1/14* (2013.01); *G09F 13/10* (2013.01); *G09F 13/044* (2021.05)

(58) Field of Classification Search
None
See application file for complete search history.

(56) References Cited

U.S. PATENT DOCUMENTS

2019/0213931 A1\* 7/2019 Brubaker ................ G09F 21/04

\* cited by examiner

*Primary Examiner* — Vip Patel
(74) *Attorney, Agent, or Firm* — Quinn IP Law

(57) ABSTRACT

A semi-transparent sign includes a reflective display, multiple layers and a control circuit. The reflective display may be semi-transparent, have a first side subject to a thermal load, have a second side opposite the first side, and configured to generate a plurality of visible images. A heat sink layer may be attached to the first side, be transparent, and configured to carry heat energy away from the reflective display. The thermal layer may be attached to the heat sink layer, be semi-transparent, and configured to reduce an intensity of the thermal load reaching the reflective display. The warming layer may be attached to the second side, be transparent, and configured to heat the reflective display in response to an electric current. The control circuit may be configured to control the electric current to the warming layer based on a temperature signal indicating a temperature of the semi-transparent sign.

20 Claims, 2 Drawing Sheets

SEMI-TRANSPARENT SIGN TEMPERATURE PROTECTION

INTRODUCTION

Emissive light emitting diode-based displays are commonly used in outdoor signage such as automobiles and billboards. The emissive light emitting diode-base displays provide high visibility because of a wide variety of colors and brightness that can be generated. However, automotive standards limit the amount of emissive light such vehicle-based displays can emit to avoid distracting drivers at night. Non-emissive displays are commonly used in controlled environments. Such displays stop functioning while environmental conditions are too hot or too cold and so are not well suited to outdoor applications.

SUMMARY

A semi-transparent sign is provided. The semi-transparent sign generally includes a reflective display, a heat sink layer, a thermal layer, a warming layer and a control circuit. The reflective display may be semi-transparent, has a first side subject to a thermal load, has a second side opposite the first side, and configured to generate a plurality of visible images. The heat sink layer may be attached to the first side of the reflective display. The heat sink layer may be transparent and configured to carry heat energy away from the reflective display. The thermal layer may be attached to the heat sink layer. The thermal layer is generally semi-transparent and configured to reduce an intensity of the thermal load reaching the reflective display. The warming layer may be attached to the second side of the reflective display. The warming layer may be transparent and configured to heat the reflective display in response to an electric current. The control circuit may be configured to control the electric current to the warming layer based on a temperature signal indicating a temperature of the semi-transparent sign.

In one or more embodiments, the reflective display may be an electrophoretic display.

In one or more embodiments, each of the heat sink layer and the warming layer may include a graphene film.

In one or more embodiments, the semi-transparent sign may further include a carrier layer attached to the warming layer and configured to provide mechanical support to the reflective display.

In one or more embodiments, the carrier layer may be transparent and may form part of a window of a vehicle.

In one or more embodiments, the semi-transparent sign may further include a return surface on the carrier layer configured to reflect light received through the reflective display back to the reflective display.

In one or more embodiments, the semi-transparent sign may form a part of an opaque region of a vehicle.

In one or more embodiments, the semi-transparent sign may further include a cover layer attached to the thermal layer, where the cover layer may be transparent and configured to provide mechanical support to the reflective display.

In one or more embodiments, the cover layer may form part of a window of a vehicle.

In one or more embodiments, the heat sink layer may be attached to the cover layer beyond a periphery of the thermal layer.

A method for thermally protecting a semi-transparent sign is provided. The method may include generating a plurality of visible images using a reflective display that is semi-transparent, has a first side subject to a thermal load, and has a second side opposite the first side. The method may include carrying heat energy away from the reflective display in a heat sink layer, where the heat sink layer is attached to the first side of the reflective display, and the heat sink layer may be transparent. The method may further include reducing an intensity of the thermal load reaching the reflective display using a thermal layer attached to the heat sink layer, where the thermal layer may be semi-transparent. The method may include heating the reflective display in response to an electric current in a warming layer, where the warming layer may be attached to the second side of the reflective display, and the warming layer may be transparent. Furthermore, the method may include controlling the electric current to the warming layer based on a temperature signal indicating a temperature of the semi-transparent sign.

In one or more embodiments, the method may further include mechanically supporting the reflective display with a carrier layer attached to the warming layer.

In one or more embodiments, the carrier layer may be transparent and form part of a window of a vehicle.

In one or more embodiments, the method may further include reflecting light received at the carrier layer through the reflective display back to the reflective display.

In one or more embodiments, the semi-transparent sign may form a part of an opaque region of a vehicle.

In one or more embodiments, the method may further include mechanically supporting the reflective display with a cover layer attached to the thermal layer, wherein the cover layer may be transparent.

In one or more embodiments, the cover layer may form part of a window of a vehicle.

A semi-transparent sign in a vehicle is provided. The semi-transparent sign generally includes a reflective display, a plurality of graphene layers, a thermal layer, a cover layer, a carrier layer, a temperature sensor and a control circuit. The reflective display may be semi-transparent, has two major surfaces, and is configured to generate a plurality of visible images on one of the major surfaces facing outward from the vehicle. The plurality of graphene layers may be attached to the major surfaces of the reflective display, where the plurality of graphene layers may be transparent. A heat sink layer of the plurality of graphene layers may be connected to a heat sink and configured to carry heat energy away from the reflective display to the heat sink. A warming layer of the plurality of graphene layers may be configured to heat the reflective display in response to an electric current. The thermal layer may be attached to the heat sink layer, where the thermal layer may be semi-transparent, and configured to reduce an intensity of infrared light reaching the reflective display. The cover layer may be attached to the thermal layer. The carrier layer may be attached to the warming layer. The temperature sensor may be configured to generate a temperature signal indicating a temperature of the semi-transparent sign. The control circuit may be configured to control the electric current to the warming layer based on the temperature signal.

In one or more embodiments, the cover layer and the carrier layer may form part of a window of the vehicle.

The above features and advantages and other features and advantages of the present disclosure are readily apparent from the following detailed description of the best modes for carrying out the disclosure when taken in connection with the accompanying drawings.

DETAILED DESCRIPTION

Various embodiments generally provide a semi-transparent sign that protects a functionality of an embedded reflective display (e.g., an electrophoretic display) from temperature extremes while keeping an overall semi-transparency of the display. The semi-transparent sign may provide heat to the reflective display for winter functionality while the ambient temperatures are too cold for the reflective display to operate. The semi-transparent sign may also provide a thermal reflective and/or absorptive layer (e.g., an infrared reflective coated glass layer) to reduce an amount of solar energy reaching the reflective device down to a low percentage (e.g., as low as 15% to 12%) for summer functionality. The term semi-transparent may mean transmitting at least 50% of an incident light. A transparent heat sink layer may be included in the semi-transparent sign for managing thermal energy that gets through the thermal layer. In various embodiments, the term transparent may mean transmitting at least 70% of the incident light. In some embodiments (e.g., a sport-utility vehicle or a truck), the term transparent may involve transmitting less than 70% of the incident light behind the B pillar. The presence of both the heating feature and the cooling feature of the semi-transparent sign generally enable a wide temperature range of operation (e.g., up to 85 degrees Celsius and down to −40 degrees Celsius).

Figure 1:
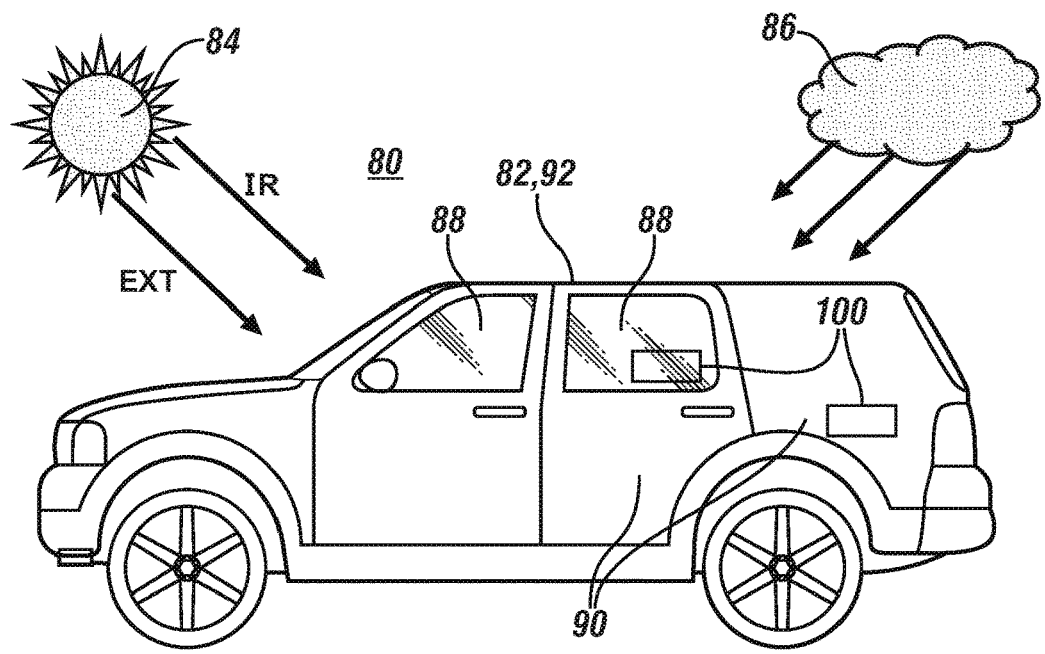
FIG. 1 is a schematic diagram illustrating a context of a system.

Referring to FIG. 1, a schematic diagram illustrating a context of a system 80 is shown. The system 80 generally comprises a platform 82, a light source 84 and weather 86. The platform 82 may include multiple windows 88 that allow visibility into an interior of the platform 82, and multiple opaque regions 90. One or more semi-transparent signs 100 may be embedded in one or more of the windows 88 and/or in one or more of the opaque regions 90. The light source 84 may present both external light (e.g., EXT) and infrared light (e.g., IR). The external light EXT generally includes visible light. The infrared light IR may include at least near-wave infrared light and mid-wave infrared light. The external light EXT and the infrared light IR are generally incident on the platform 82, including the semi-transparent signs 100.

The platform 82 may include, but is not limited to, vehicles 92 such as automobiles, trucks, motorcycles, boats, trains and/or aircraft. In some embodiments, the platform 82 may include stationary objects such as billboards, kiosks and/or marquees. Other types of platforms may be implemented to meet the design criteria of a particular application.

The light source 84 may be one or more sources of at least the visible light EXT. The light source 84 may include, but is not limited to, the sun, the moon, street lights, stadium lights and construction site lights. The external light EXT generally provides the lighting that enables a person outside the platform 82 to read the semi-transparent signs 100.

The weather 86 may be a source of hot weather, warm weather and cold weather at various times and various locations. In extreme conditions, the weather 86 may be hotter than 65 degrees Celsius or colder than −40 degrees Celsius. Extreme hot weather 86 generally adds to the thermal load experienced by the platform 82 due to the infrared light IR. Extreme cold weather 86 may affect an ability of the platform 82 to function.

The windows 88 may be part of the vehicle 92. The windows 88 may include, but are not limited to, a windshield, door windows, a rear windshield, side windows and moon roof windows. The windows 88 generally allow passengers inside the vehicle 92 to see outside the vehicle 92. The windows 88 may also allow people outside the vehicle 92 to see into and through the vehicle 92.

The opaque regions 90 of the vehicle 92 generally include the sides of the vehicle 92. The sides may include a front quarter panel, doors, a rear quarter panel and other regions within the sides of the vehicle 92. In some designs, opaque regions 90 may also exist in a rear end of the vehicle 92.

The semi-transparent sign 100 may implement a visual image display or a semi-transparent display. The semi-transparent sign 100 is generally operational to display images to the exterior of the platform 82. An active portion of the semi-transparent sign 100 may be a reflective display. The semi-transparent sign 100 may include multiple layers on the reflective display to support shedding the thermal load caused by the infrared light IR and/or the weather 86. A warming layer and an electric current source may be included as part of the semi-transparent sign 100 to support heating the reflective display while the ambient temperature of the weather 86 is too cold for normal operation of the reflective display. Dimensions of the semi-transparent sign 100 may range from a few inches (e.g., two inches) on each side up to several feet (e.g., five feet) on each side.

Figure 2:
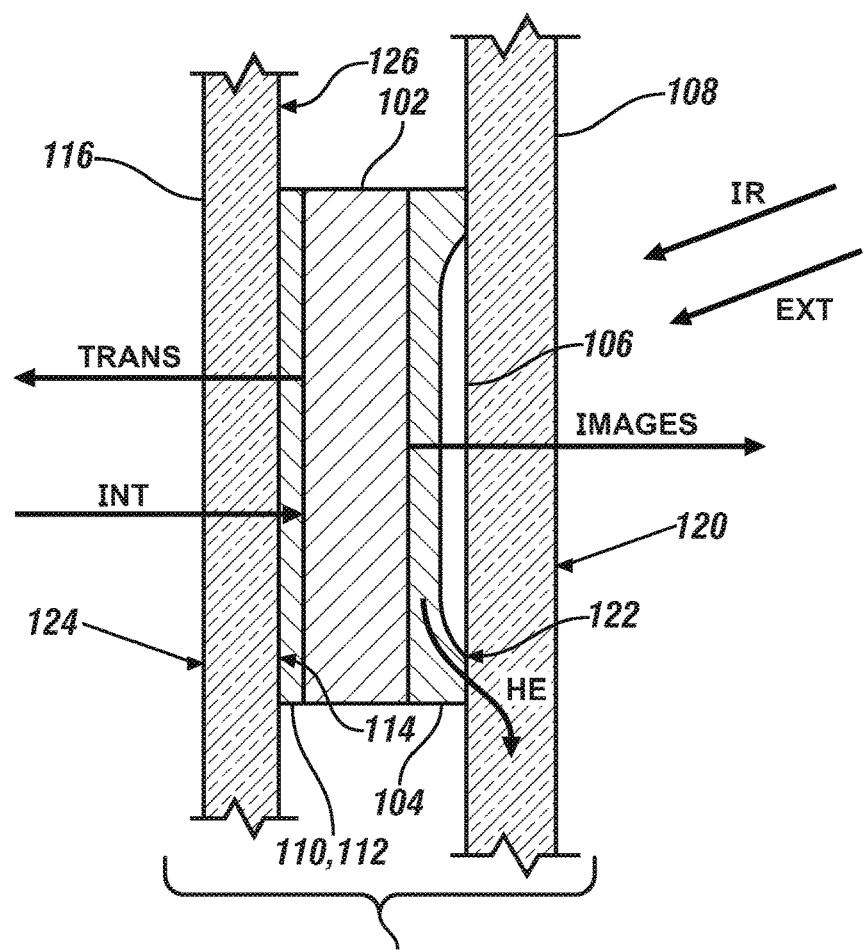
FIG. 2 is a schematic diagram of a cross-sectional view of a semi-transparent sign in the system in accordance with an exemplary embodiment.

Referring to FIG. 2, a schematic diagram of a cross-ssectional view of an example semi-transparent sign 100 is shown in accordance with an exemplary embodiment. The semi-transparent sign 100 generally comprises a reflective display 102, a heat sink layer 104, a thermal layer 106, a cover layer 108, a warming layer 110 and a carrier layer 116. The semi-transparent sign 100 may be oriented on the platform 82 such that the external light EXT and the infrared light IR are incident on the cover layer 108. Some of the external light EXT and/or the infrared light IR may pass through the semi-transparent sign 100 and emerge through the carrier layer 116 as a transmitted light (e.g., TRANS). Light (e.g., INT) internal to the platform 82 may be incident on the carrier layer 116. A control signal (e.g., CTR) may be received by the reflective display 102. The external light EXT may be spatially modulated, intensity modulated and optionally color modulated by the reflective display 102 to generate multiple visible images in a visible signal (e.g., IMAGES).

The reflective display 102 may implement an electrophoretic display. The reflective display 102 is generally operational to change opaqueness in different areas in response to the control signal CTR. The changes in opaqueness generally modulate the intensity and optionally the color of the external light EXT reflected by the reflective display 102. The modulated reflected light may form the images in the visible signal IMAGES. Since the reflective display 102 is a non-emissive type display, the semi-transparent sign 100 generally behaves similar to automotive paint and so is not subject to the same automotive standards as emissive type displays.

The heat sink layer 104 may be implemented as a graphene layer directly attached (e.g., connected or glued) to an outward facing major surface 120 of the reflective display 102. A thickness of the heat sink layer 104 generally ranges from approximately 0.335 nanometers (nm) to approximately 1.2 nm. The heat sink layer 104 may be transparent to allow the external light EXT and the visible signal IMAGES to pass through with little obstruction. The heat sink layer is generally operational to carry heat energy (shown as arrows HE in the figure) away from the reflective display 102. In various embodiments, the heat sink layer 104 may extend beyond a periphery 122 of the thermal layer 106 and come into direct contact with the cover layer 108. The direct contact generally causes the heat energy HE to flow from the heat sink layer 104 into the cover layer 108.

The thermal layer 106 may be implemented as an infrared reflective and/or an infrared absorptive layer. The thermal layer 106 may be attached (e.g., connected or glued) to the heat sink layer 104. The thermal layer 106 may be semi-transparent to allow the external light EXT and the visible signal IMAGES to pass through with limited obstruction. The thermal layer 106 is generally operational to reflect and/or absorb the thermal load (e.g., the infrared light IR) incident on the semi-transparent sign 100 from the light source 84. In some embodiments, the thermal layer 106 may be implemented with a fluorinated tin oxide layer, one or more thin silver layers or a pyrolytic coating of a metallic oxide. The thermal layer generally reduces the thermal load reaching the heat sink layer 104 to a low level. Some of the materials used to fabricate the thermal layer 106 may reduce the thermal load to approximately 12% to 15% of that incident on the cover layer 108.

The cover layer 108 may be implemented as a glass cover layer. In some embodiments, the cover layer 108 may be an automotive glass cover layer. The cover layer 108 may be attached (e.g., connected or glued) to the thermal layer 106. The cover layer 108 may be transparent to allow the external light EXT, the infrared light IR and the visible signal IMAGES to pass through with little obstruction. Mechanical support and protection for the outward facing major surface 120 of the reflective display 102 may be provided by the cover layer 108. The cover layer 108 may also act as a large heat sink for the heat energy HE received from the heat sink layer 104. The cover layer 108 may be transparent so allow the external light EXT and the infrared light IR to pass through to the thermal layer 106.

The warming layer 110 may comprise a graphene layer 112 and a nanowire film (or backplane) 114. The warming layer 110 may be transparent to allow the transmitted light TRANS and the internal light INT to pass through with little obstruction. The graphene layer 112 may be directly attached (e.g., connected or glued) to an inward facing major surface 124 of the reflective display 102. A thickness of the graphene layer 112 generally ranges from approximately 0.335 nm to approximately 1.2 nm.

The nanowire film 114 may be formed on a side of the warming layer 110 opposite the reflective display 102. A thickness of the nanowire film 114 generally ranges from approximately 30 nm to approximately 400 nm. In various embodiments, the nanowire film 114 may be implemented as a silver nanowire backplane. The nanowire film 114 may be directly attached to the graphene layer 112. The nanowire film 114 is generally operational to heat the graphene layer 112 and the reflective display 102. The heat may be resistive heat generated by passing electrical current in an electrical signal (e.g., I, see FIG. 3) through the nanowire film 114.

In some embodiments, the carrier layer 116 may implement a glass laminated carrier plane. The carrier layer 116 may be attached (e.g., connected or glued) to the warming layer 110. The carrier layer 116 may provide protection and mechanical support to the reflective display 102. The carrier layer 116 may be transparent to allow the transmitted light TRANS and the internal light INT to pass through making the semi-transparent sign 100 suitable to form part of the windows 88. In other embodiments where the semi-transparent sign 100 is mounted in an opaque region 90, the carrier layer 116 may include a return surface 126. The return surface 126 may be a mirrored, shiny or white surface suitable to reflect the external light EXT that passed through the cover layer 108, the thermal layer 106, the heat sink layer 104, the reflective display 102, and the warming layer 110. The return surface 126 may direct the reflected light back toward the reflective display 102. The external light EXT reflected by the carrier layer 116 may enhance the visibility of the images (e.g., words, number, pictures, graphical shapes, video, etc.) in the visible signal IMAGES.

Figure 3:
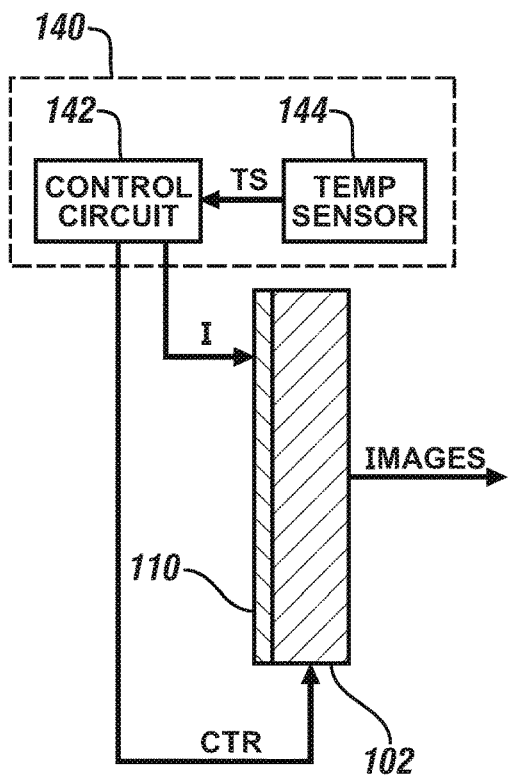
FIG. 3 is a schematic diagram illustrating electrical components of the semi-transparent sign in accordance with an exemplary embodiment.

Referring to FIG. 3, a schematic diagram illustrating electrical components 140 of the semi-transparent sign 100 is shown in accordance with an exemplary embodiment. The electrical components 140 generally comprise a control circuit 142 and a temperature sensor 144. The temperature sensor 144 may generate a temperature signal (e.g., TS) received by the control circuit. The temperature signal TS may convey a measured temperature of the semi-transparent sign 100. The electrical signal I may be generated by the control circuit 142 and presented to the warming layer 110 (the nanowire film 114). The electrical signal I may convey a current that causes the resistive heating in the warming layer 110. The control circuit 142 may generate the control signal CTR received by the reflective display 102. The control signal CTR may carry display information used by the reflective display 102 to generate the images in the visible signal IMAGES.

The control circuit 142 is generally operational to control the warming function of the semi-transparent sign 100 based on a hysteresis cycle of the temperature signal TS. While the temperature signal TS indicates that an internal temperature of the semi-transparent sign 100 falls below a lower threshold (e.g., approximately 5 degrees Celsius), the control circuit 142 may generate a current in the electrical signal I to create heat in the warming layer 110. A strength of the heating may depend upon the current temperature of the semi-transparent sign 100. Heating may continue until the temperature signal TS indicates that the internal temperature of the semi-transparent sign 100 has reached an upper threshold (e.g., approximately 10 degrees Celsius). Once the temperature has reached the upper threshold, the current in the electrical signal I may be switched off until the temperature falls below the lower threshold again. The control circuit is also operational to generate the control signal CTR. The control signal CTR may be created based on information stored within the control circuit 142 and/or information received by the control circuit 142 from an external source.

The temperature sensor 144 may be implemented as one or more temperature sensors mounted between the cover layer 108 and the carrier layer 116. The temperature sensor 144 may be operational to measure an internal temperature within the semi-transparent sign 100. The measured internal temperature may be reported in the temperature signal TS to the control circuit 142. In various embodiments, the temperature sensor 144 may be mounted close to or physically attached (e.g., connected or glued) to the reflective display 102.

Figure 4:
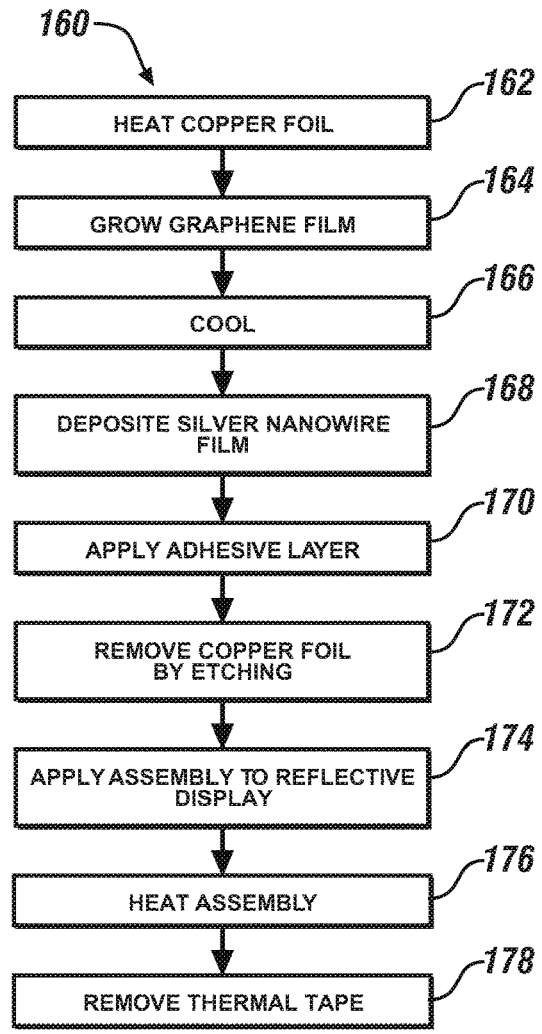
FIG. 4 is a flow diagram of a method for fabricating a heat sink layer and a warming layer on a reflective display of the semi-transparent sign in accordance with an exemplary embodiment.

Referring to FIG. 4, a flow diagram of an example method 160 for fabricating the heat sink layer 104 and the warming layer 110 on the reflective display 102 is shown in accordance with an exemplary embodiment. The method (or process) 160 may be performed with standard fabrication processes. An order of the method 160 illustrated may be representative of a fabrication technique. Other sequences and/or other numbers of steps may be implemented to meet the design criteria of a particular application.

In an initial step 162, a copper foil may be heated in a chamber into a range of approximately 800 degrees Celsius to approximately 1000 degrees Celsius. A mixture of methane gas and hydrogen gas may be introduced into the heated chamber in step 164 to grow a graphene film on the copper foil. After the graphene film has been formed, the copper/graphene membrane may be cooled in step 166.

For graphene films destined to become the graphene layer 112 within the warming layer 110, the nanowire film 114 may be formed on the exposed graphene film in step 168. In various embodiments, the nanowire film 114 may comprise a silver nanowire film. For graphene films destined to become the heat sink layer 104, the formation of the nanowire film 114 in step 168 may be skipped. A thermal release tape, an adhesive layer of the carrier layer 116, or an adhesive layer on the thermal layer 106 (previously attached to the cover layer 108) may be applied to an exposed side of the graphene layer 112 in step 170 by pressing the thermal release tape, carrier layer 116, or the thermal layer 106/cover layer 108 to the graphene-to-copper membrane (e.g., graphene/copper or graphene/nanowire/copper) between rollers. In step 172, the copper foil may be removed by etching.

For the heat sink layer 104, the graphene/thermal release tape membrane or the graphene/thermal layer/cover layer assembly may be applied to the outward facing major surface 120 of the reflective display 102 in step 174. For the warming layer 110, the nanowire/graphene/release tape membrane or the carrier layer/nanowire/graphene assembly may be applied to the inward facing major surface 124 of the reflective display 102. In situations that use the thermal release tape, an assembly comprising the reflective display 102, the heat sink layer 104 and the warming layer 110 may be heated in step 176. Once in the range of approximately 90 degrees Celsius to approximately 120 degrees Celsius, the thermal release tape generally unsticks from the heat sink layer 104 and from the nanowire film 114 and so may be removed in step 178.

Figure 5:
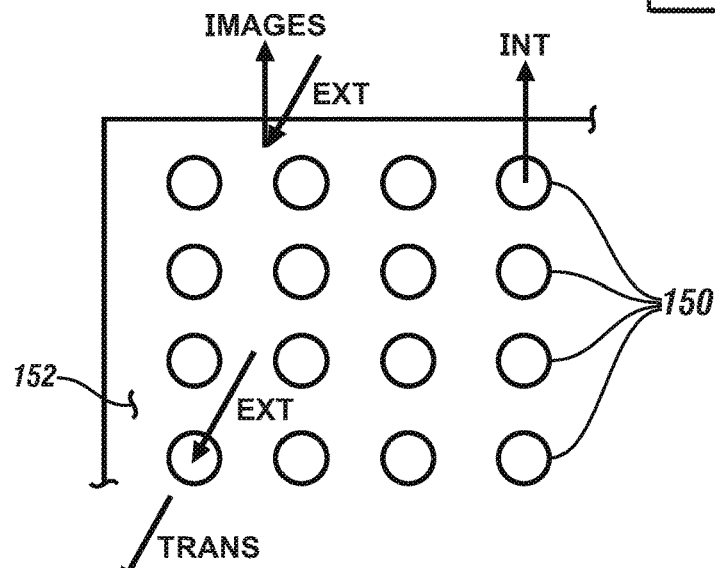
FIG. 5 is a schematic diagram illustrating a closeup of a portion of the reflective display in accordance with an exemplary embodiment.

Referring to FIG. 5, a schematic diagram illustrating a closeup of a portion of a reflective display 102 is shown in accordance with an exemplary embodiment. A matrix of holes 150 may be formed through an active portion 152 of the reflective display 102. Each hole 150 may have a diameter in a range of approximately 1.0 millimeters (mm) to approximately 2.0 mm.

Some portions of the external light EXT may bounce off reflective areas of the active portion 152 and become bright areas in the visible signal IMAGES. Other portions of the external light EXT may be absorbed by non-reflective areas of the active portion 152 and become dark areas in the visible signal IMAGES. Still other portions of the external light EXT may fall on the holes 150 and be transferred through the reflective display 102 to become the transmitted light TRANS. Portions of the internal light INT may pass through the holes 150 and become a background image in the visible signal IMAGES. The background image generally allows a person external to the vehicle 92 to see through the semi-transparent sign 100.

A ratio of a total area of the holes 150 to an area of the active portion 152 may range from approximately 30% to 70%. Implementing more holes 150 and/or larger holes 150 generally makes the reflective display 102 more transparent. Implementing fewer holes 150 and/or smaller holes 150 may result in more viewable features in the visible signal IMAGES.

The features that protect the reflective display 102 from the environment may be transparent thus allowing for outdoor use in harsh environments. A low electrical power consumption, a packaging efficiency and an ability to stay functional in extreme environments (both hot and cold) generally makes the semi-transparent sign 100 suitable for automobile applications. The graphene layers generally provide a transparent material that is highly conductive both electrically and thermally, and so are suitable for electrophoretic heating and cooling. Since automotive standards limit the amount of emissive visible radiation, the use of displays that reflect, such as electrophoretic displays, cause the semi-transparent sign 100 to behave like automotive paint and so is easier to get approved for on-road application. Furthermore, construction of the semi-transparent sign 100 generally allows automotive glass applications where the semi-transparent sign 100 is disposed between outer layers of the automotive glass.

While the best modes for carrying out the disclosure have been described in detail, those familiar with the art to which this disclosure relates will recognize various alternative designs and embodiments for practicing the disclosure within the scope of the appended claims.

What is claimed is:

1. A semi-transparent sign comprising:
   a reflective display that is semi-transparent, has a first side subject to a thermal load, has a second side opposite the first side, and is configured to generate a plurality of visible images;
   a heat sink layer attached to the first side of the reflective display, wherein the heat sink layer is transparent and configured to carry heat energy away from the reflective display;
   a thermal layer attached to the heat sink layer, wherein the thermal layer is semi-transparent and configured to reduce an intensity of the thermal load reaching the reflective display;
   a warming layer attached to the second side of the reflective display, wherein the warming layer is transparent and configured to heat the reflective display in response to an electric current; and
   a control circuit configured to control the electric current to the warming layer based on a temperature signal indicating a temperature of the semi-transparent sign.

2. The semi-transparent sign according to claim 1, wherein the reflective display is an electrophoretic display.

3. The semi-transparent sign according to claim 1, wherein each of the heat sink layer and the warming layer comprise a graphene film.

4. The semi-transparent sign according to claim 1, further comprising a carrier layer attached to the warming layer and configured to provide mechanical support to the reflective display.

5. The semi-transparent sign according to claim 4, wherein the carrier layer is transparent and forms part of a window of a vehicle.

6. The semi-transparent sign according to claim 4, further comprising a return surface on the carrier layer configured to reflect light received through the reflective display back to the reflective display.

7. The semi-transparent sign according to claim 6, wherein the semi-transparent sign forms a part of an opaque region of a vehicle.

8. The semi-transparent sign according to claim 1, further comprising a cover layer attached to the thermal layer, wherein the cover layer is transparent and is configured to provide mechanical support to the reflective display.

9. The semi-transparent sign according to claim 8, wherein the cover layer forms part of a window of a vehicle.

10. The semi-transparent sign according to claim 8, wherein the heat sink layer is attached to the cover layer beyond a periphery of the thermal layer.

11. A method for thermally protecting a semi-transparent sign, comprising:
  generating a plurality of visible images using a reflective display that is semi-transparent, has a first side subject to a thermal load, and has a second side opposite the first side;
  carrying heat energy away from the reflective display in a heat sink layer, wherein the heat sink layer is attached to the first side of the reflective display, and the heat sink layer is transparent;
  reducing an intensity of the thermal load reaching the reflective display using a thermal layer attached to the heat sink layer, wherein the thermal layer is semi-transparent;
  heating the reflective display in response to an electric current in a warming layer, wherein the warming layer is attached to the second side of the reflective display, and the warming layer is transparent; and
  controlling the electric current to the warming layer based on a temperature signal indicating a temperature of the semi-transparent sign.

12. The method according to claim 11, further comprising:
  mechanically supporting the reflective display with a carrier layer attached to the warming layer.

13. The method according to claim 12, wherein the carrier layer is transparent and forms part of a window of a vehicle.

14. The method according to claim 12, further comprising:
  reflecting light received at the carrier layer through the reflective display back to the reflective display.

15. The method according to claim 14, wherein the semi-transparent sign forms a part of an opaque region of a vehicle.

16. The method according to claim 11, further comprising:
  mechanically supporting the reflective display with a cover layer attached to the thermal layer, wherein the cover layer is transparent.

17. The method according to claim 16, wherein the cover layer forms part of a window of a vehicle.

18. A semi-transparent sign in a vehicle, the semi-transparent sign comprising:
  a reflective display that is semi-transparent, has two major surfaces, and is configured to generate a plurality of visible images on one of the major surfaces facing outward from the vehicle;
  a plurality of graphene layers attached to the major surfaces of the reflective display, wherein the plurality of graphene layers are transparent, a heat sink layer of the plurality of graphene layers is connected to a heat sink and configured to carry heat energy away from the reflective display to the heat sink, and a warming layer of the plurality of graphene layers is configured to heat the reflective display in response to an electric current;
  a thermal layer attached to the heat sink layer, wherein the thermal layer is semi-transparent, and configured to reduce an intensity of infrared light reaching the reflective display;
  a cover layer attached to the thermal layer;
  a carrier layer attached to the warming layer;
  a temperature sensor configured to generate a temperature signal indicating a temperature of the semi-transparent sign; and
  a control circuit configured to control the electric current to the warming layer based on the temperature signal.

19. The semi-transparent sign according to claim 18, wherein the cover layer and the carrier layer form part of a window of the vehicle.

20. The semi-transparent sign according to claim 18, further comprising a return surface on the carrier layer configured to reflect light received through the reflective display back to the reflective display.

* * * * *